(12) United States Patent
Teufel et al.

(10) Patent No.: US 8,866,442 B2
(45) Date of Patent: Oct. 21, 2014

(54) METHOD AND DEVICE FOR CHARGING RECHARGEABLE BATTERIES

(75) Inventors: Thomas Teufel, Balgheim (DE);
Markus Teufel, Tuttlingen (DE)

(73) Assignee: PAADE GmbH, Balgheim (DE)

( * ) Notice: Subject to any disclaimer, the term of this patent is extended or adjusted under 35 U.S.C. 154(b) by 637 days.

(21) Appl. No.: 12/799,821

(22) Filed: May 3, 2010

(65) Prior Publication Data

US 2010/0320957 A1 Dec. 23, 2010

(30) Foreign Application Priority Data

May 4, 2009 (DE) .......................... 10 2009 003 873

(51) Int. Cl.
 *H02J 7/00* (2006.01)
(52) U.S. Cl.
 CPC ............. *H02J 7/0013* (2013.01); *H02J 7/0075* (2013.01)
 USPC ............ 320/124; 320/101; 320/126; 320/137
(58) Field of Classification Search
 USPC ....................... 320/101, 103, 126, 124; 1/101
 See application file for complete search history.

(56) References Cited

U.S. PATENT DOCUMENTS

| | | | |
|---|---|---|---|
| 5,164,654 A * | 11/1992 | Bertram et al. ............... | 320/102 |
| 5,936,380 A * | 8/1999 | Parrish .......................... | 320/101 |
| 6,870,089 B1 | 3/2005 | Gray | |
| 6,977,482 B2 * | 12/2005 | Popescu-Stanesti et al. . | 320/116 |
| 7,200,009 B2 | 4/2007 | Narhi et al. | |
| 7,348,760 B2 * | 3/2008 | Bucur et al. .................. | 320/132 |
| 7,982,430 B2 * | 7/2011 | Breen et al. ................... | 320/128 |
| 7,994,657 B2 * | 8/2011 | Kimball et al. ................ | 307/82 |
| 2008/0197801 A1 * | 8/2008 | Manor et al. .................. | 320/103 |
| 2008/0197805 A1 * | 8/2008 | Pellenc ......................... | 320/116 |
| 2009/0102424 A1 * | 4/2009 | Tien et al. ..................... | 320/124 |
| 2009/0267565 A1 * | 10/2009 | Studyvin et al. .............. | 320/116 |
| 2009/0284225 A1 * | 11/2009 | Nakanuma et al. ........... | 320/134 |
| 2011/0148344 A1 * | 6/2011 | Manor et al. .................. | 320/103 |

FOREIGN PATENT DOCUMENTS

| | | |
|---|---|---|
| DE | 42 04 326 | 8/1992 |
| DE | 10 2005 008 013 | 8/2006 |
| DE | 20 2006 012 404 | 11/2006 |
| DE | 600 32 251 | 4/2007 |
| EP | 1 220 350 | 7/2002 |
| EP | 1 648 048 | 4/2006 |
| EP | 1 850 204 | 10/2007 |

* cited by examiner

*Primary Examiner* — Drew A Dunn
*Assistant Examiner* — Nathaniel Pelton
(74) *Attorney, Agent, or Firm* — Collard & Roe, P.C.

(57) ABSTRACT

Rechargeable batteries are used as a power supply in the most varied electrical devices. Parallel to this, connections with other energy sources are frequently available, at least for part of the time, in order to charge the rechargeable batteries during this time. Particularly efficient lithium ion batteries have the problem that short charging/discharging cycles cause them to age just as much as long cycles, during which the user can derive greater benefit from them. It is the task of the invention to ensure particularly effective use of rechargeable batteries during charging/discharging cycles of the most varied duration. This is achieved in that the rechargeable battery is divided into cells, of which only one is charged, in each instance, and the others stand ready to provide energy. If the network voltage stops, charging of the cell just being charged is completed from the other cells.

2 Claims, 2 Drawing Sheets

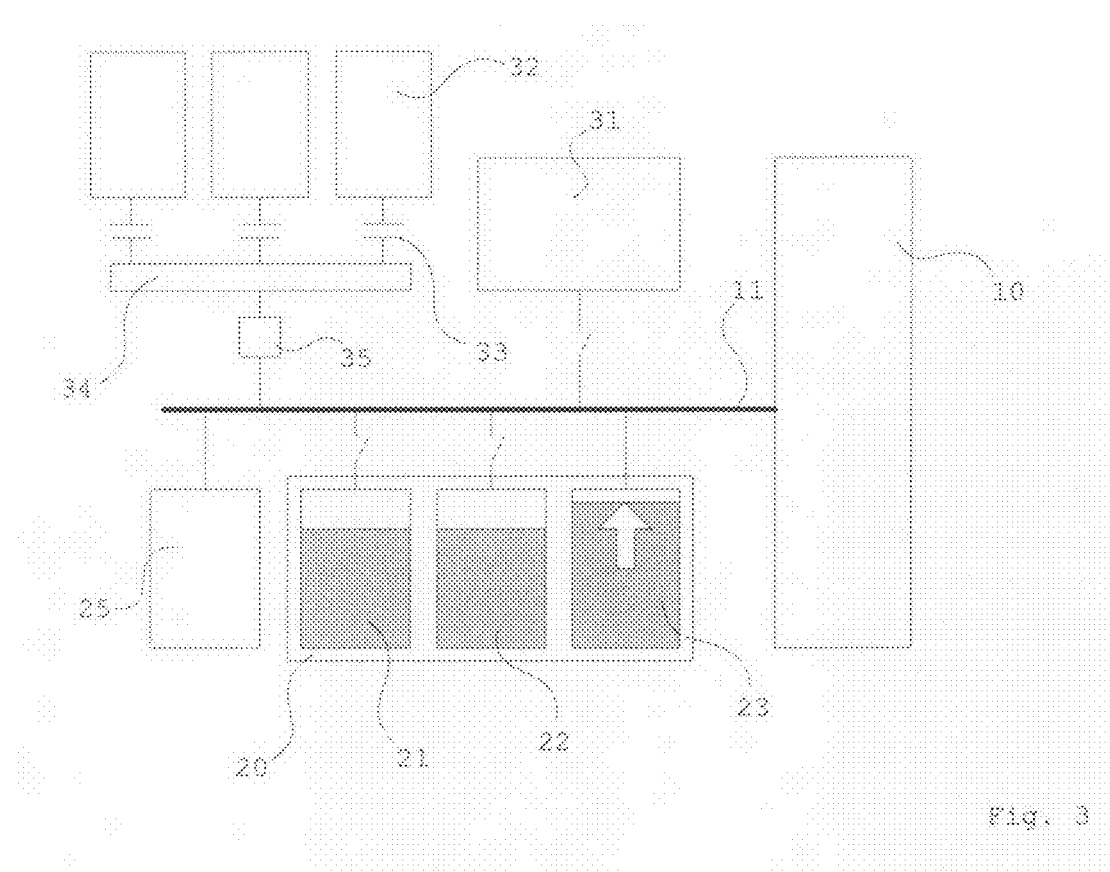

METHOD AND DEVICE FOR CHARGING RECHARGEABLE BATTERIES

CROSS REFERENCE TO RELATED APPLICATIONS

Figure 1:
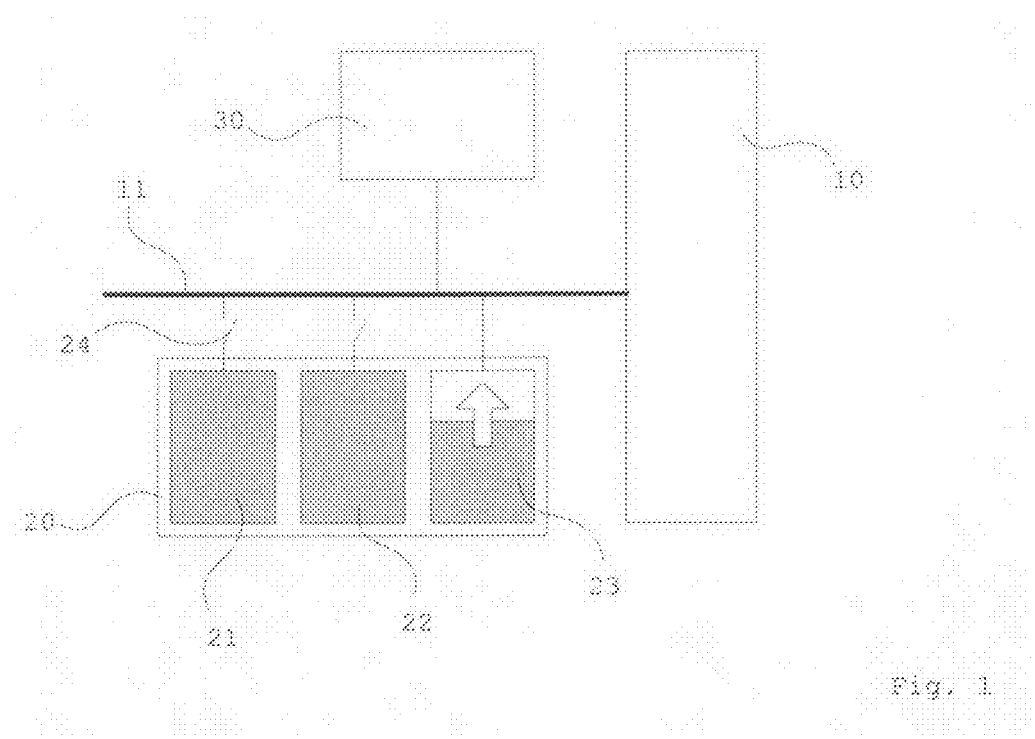

Applicants claim priority under 35 U.S.C. §119 of German Application No. 10 2009 003 873.6 filed on May 4, 2009, the disclosure of which is incorporated by reference.

The present invention relates to a method and a device for charging rechargeable batteries, particularly lithium ion batteries, in which at least one voltage supply supplies electrical energy to a consumer and is connected with at least one of the cells of a rechargeable battery that is divided into multiple, preferably similar cells, in order to charge this battery.

Such devices are known from many electrical devices that work with rechargeable batteries. For example, a concept is shown on the Internet site of the Apple company, which provides for a total of four rechargeable battery cells next to one another, whereby it is precisely checked, for each individual one of the rechargeable battery cells, what charging and discharging current is ideal for the cell in question. By means of this method of procedure, which is called "adaptive charging," an increased useful lifetime of the individual battery cells is guaranteed, and this is of great interest, particularly when using portable computers, so-called laptops, in order to be able to operate these for the longest possible period of time, independent of external voltage supplies, in stand-alone operation.

Such laptops have been known for a long time, and are state of the art, whereby the principle of the laptop essentially lies in that the power needed for operation of the computer does not come from a stationary voltage source, such as an electrical outlet, for example, but rather is carried along in the form of batteries or rechargeable batteries. In this connection, it is part of the constant efforts of the developers of such laptops, for one thing, to equip the batteries with the longest possible useful lifetime, with regard to both their overall use and their capacity.

A very promising solution supplementally provides, in this regard, for connecting voltage sources that operate in stand-alone mode with the laptop, to outfit the laptop with solar cell modules by way of which additional energy can be obtained for the laptop by means of the solar radiation that occurs at the site of operation. In this manner, it is possible to keep the rechargeable batteries provided in the laptop in stand-alone operation for a longer time, by means of the amount of energy that flows in during stand-alone operation, or, in an ideal case, to actually operate the laptop exclusively by way of the energy obtained by means of the solar cells.

However, since solar energy is only sufficient for complete stand-alone operation when the solar radiation is sufficient, i.e. a laptop is also supposed to be operated under disadvantageous light conditions, it appears unavoidable to give the laptop a rechargeable battery in every case. At present, the lithium ion battery, which has found use in many areas of application, because of its particularly great efficiency, is suitable for operation with a laptop, but also with regard to many other applications. In particular, there is no memory effect in the case of the lithium ion battery, by means of which effect capacity losses occur, particularly in the known nickel-cadmium batteries, if they are not completely charged and discharged. Also, lithium ion batteries can be found in many electronic devices, even sensitive devices, because of their thermal stability and the constant voltage that is supplied.

Aging is a problem in connection with lithium ion batteries. Usually, such a rechargeable battery is only available for a limited number of charging cycles, with the duration of such a cycle, in particular, not playing any role in this aging. In other words, relatively short charging and short discharging can bring about aging of the lithium ion battery that is just as great as complete charging and subsequent complete discharging of the rechargeable battery.

If a combination of a device driven by a rechargeable battery and an additional supply by means of solar cells is now supposed to come about, in this connection the problem occurs that because of greatly varying light impacting on the solar cell, very short charging and discharging cycles occur in the device, in part, if the light conditions change for such a short time that at first, the rechargeable battery can be charged, and at the next moment, current from the rechargeable battery is required again. Such a configuration appears to be extremely ineffective, because of the aging processes that occur here.

Against this background, the present invention is based on the task of remedying this, and of creating a possibility for effectively operating a lithium ion battery even with current sources that are only available for a short time, and taking the aging processes of a rechargeable battery during its charging into account.

According to the invention, for this purpose a configuration is provided, in which a rechargeable battery is divided into multiple, particularly similar cells. These cells are switched in parallel to one another, so that the capacitances of the individual cells are added to one another. However, the individual rechargeable battery cells can be controlled independent of one another, and, in particular, can be brought into a charging state or a discharging state independent of one another. Within the scope of the invention, attention must now be paid to ensure that a cell, once its charging has started, is continuously charged until the end of the charging cycle, in other words the charging cycle is not interrupted, and, in particular, no withdrawal of energy takes place. For this purpose, a cell of the rechargeable battery selected for charging is first connected with the voltage supply, and only disconnected from the voltage supply again once charging of the cell in question has progressed up to a maximal value, which is determined by the fact that a threshold value has been exceeded. If the voltage supply is no longer available before completion of complete charging of the cell, the cell in question continues to be charged from the energy of the other cells, which supply their energy to the connected consumer in any case, in place of the external voltage supply, when this happens.

In this way, it is guaranteed that a charging cycle is always finished completely, in other words the aging process of a cell is delayed for as long as possible. Furthermore, a current signal is regularly required for concluding a charging cycle, which signal costs additional energy, so that this, too, is saved within the scope of the proposed method.

In concrete terms, it is provided that at a certain point in time, at most precisely one cell is being charged, so that all the other available cells keep the energy stored in them available for the consumer. Of course, it is also possible to switch multiple cells in parallel, in such a manner that they can also be charged simultaneously and discharged simultaneously, in each instance, but in the sense of the invention, such a double cell is also viewed as being only a single cell in the following. The fact that only one cell is being charged at any point in time has the particular advantage that a cell, once its charging has started, is blocked for withdrawal of energy, so that it is practical to allow all the available energy to flow into only one cell, and to begin with the next cell only after completion of the charging process of the one cell.

Vice versa, it is only practical to begin with charging a cell if sufficient energy is available for this purpose on the part of the voltage supply. Otherwise, the rechargeable batteries would constantly be charging one another, and this would not make any sense, in the end result.

Only a completely charged cell is then released for supplying energy to the consumer—or to another cell to be charged—unless the cell that started charging was the only remaining energy source in the system. In this case, the energy stored in the last remaining cell would be made available to the consumer.

A system bus is assigned to the system as a sort of "energy pool," and the rechargeable batteries as well as the voltage sources and also the consumer can be connected to it, in such a manner that all the components can also be disconnected from the system bus again, depending on the status of the system. For example, when a laptop is taken along, standalone operation starts by means of separation of the voltage supply from the system bus, and the consumer, in turn, is disconnected from the system bus by being turned off. The rechargeable battery cells can also be disconnected from the system bus, whereby these can be connected with the system bus in two ways, namely for charging the cells in question by way of the energy that is applied to the system bus, for one thing, or alternatively, for making available the energy that is stored in them, on the system bus.

In order to be able to make available a supply on the part of the voltage supply even in stand-alone operation, the voltage supply comprises not only a power supply unit with which the system bus can be connected with a voltage network, but also at least one solar cell array by way of which energy in the form of solar energy can be converted into electrical energy. This energy is made available to the consumer, supplementally to the energy kept available in the rechargeable battery cells, and is fed into the cells in the event of an excess.

In concrete terms, such a solar cell array in turn consists of solar blocks that can be operated independent of one another, which can be disposed at different locations of the laptop. For example, a hand rest area in the vicinity of the keyboard is suitable for accommodating solar cells, since this area regularly faces upward in operation, and thus should possess a relatively direct insolation. Vice versa, the laptop cover also has a large surface that can be equipped with solar cells, but this area tends to be directed downward during operation and only receives little insolation directly.

In this regard, it is also practical to provide the individually controllable solar blocks with a buffer capacitor, in each instance, which can be charged by the energy converted by the solar blocks. In order to improve the efficiency of the individual solar blocks, an inductance is assigned to each buffer capacitor, which determines the change in the voltage applied. Because this voltage measurement value is determined, the ideal charging voltage can then be set for the buffer capacitor, in each instance, in such a manner that the greatest possible energy yield from each of the solar blocks can be achieved. For example, a solar block on the laptop cover can be adapted to a low insolation during operation, in other words when it is facing downward, while the same array is set to a higher insolation after operation, in other words when the laptop is closed.

The buffer capacitors are then connected with the system bus, in order to supply it with energy. If necessary, an accumulative capacitor can be provided as an additional buffer for this purpose, in order to keep the energy at the system bus as constant as possible. A suitable regulation network ensures that the buffer capacitors are emptied, to such an extent that as uniform a voltage as possible is applied to the system bus, in the correct amount.

A buffer rechargeable battery can be provided as such an accumulative capacitor, or also supplemental to it, and this is a nickel-cadmium battery, for example. Such a rechargeable battery does not suffer from the problems of aging as the result of its number of charging cycles, so that it certainly appears suitable as a buffer for the device indicated above.

Such a device can both be integrated into the laptop as such, or can be connected from the outside, as a completely external device, as an alternative to the conventional rechargeable batteries in the laptop housing. Also, it is possible that additional solar blocks are connected by way of external connectors. For example, it is particularly possible to connect a mouse pad or comparable pad with external solar blocks, which either cover an area in the vicinity of the laptop that is required in any event, or also are set up as a purely additional irradiated surface, for example. Thus, it might be practical and pleasant to sit under a tree with one's laptop, and to set up an external pad in the area next to the tree, so as to be able to catch the full sun there. In connection with a completely external device, which is present either as a substitute for a device indicated above, or supplemental to it, once again, buffer capacitors, accumulative capacitors, or also other cells can be assigned to this device, as well.

In the following, the invention described above will be explained in greater detail, using an exemplary embodiment.

Figure 2:
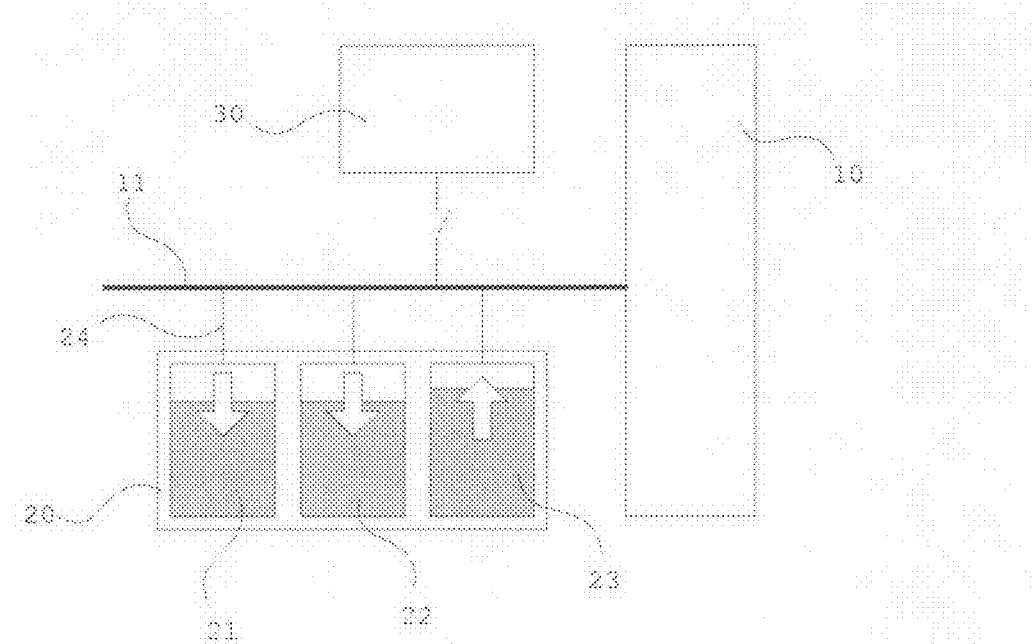

The figures show:

FIG. 1 a device for charging rechargeable batteries, in a schematic representation, FIG. 2 the device according to FIG. 1 when the voltage supply stops, and FIG. 3 the device according to FIG. 1 with a solar cell array attached to it.

FIG. 1 schematically shows a device for charging rechargeable batteries, in which a rechargeable battery 20 is connected with a consumer 10 by way of a system bus 11. Also, a voltage supply 30 is connected with the system bus 11, so that in the present case, the consumer 10 is supplied with energy by the voltage supply 30. The voltage supply 30 applies the required voltage to the system bus 11, on which sufficient energy is now present for operation of the consumer 10, and also excess energy is available. The rechargeable battery 20 that is also connected with the system bus 11 is divided into three cells 21, 22, 23, which can be connected with the system bus 11 and disconnected from it independent of one another. In the present case, the first cell 21 and the second cell 22 are completely charged, and, since the consumer 10 is supplied by way of the voltage supply 30, are disconnected from the system bus 11. The third cell 23 is connected with the system bus 11 and is charged using the excess energy that is present at the system bus 11.

FIG. 2 shows the device seen before, after the voltage supply 30 was disconnected from the system bus 11, in other words it represents stand-alone operation of a laptop. The consumer 10 is now being supplied by way of the system bus 11, by means of the first cell 21 and the second cell 22. Since no energy is now available any longer for charging the third cell 23 any further, on the part of the voltage supply 30, the third cell 23 is now also charged from the energy stored in the first cell 21 and the second cell 22. This is done in order not to interrupt the charging cycle of the third cell 23, in other words in order to delay the aging of the third cell 23 as much as possible. As soon as the third cell 23 has been completely charged in this state, the charging cycle of the third cell 23 is terminated and the energy stored in the third cell 23 is also made available to the consumer 10. A charging cycle for another cell is only started once an external voltage supply 30 is connected with the system bus 11 again.

FIG. 3 shows an expanded device in which a differentiation must be made on the part of the voltage supply 30, between a power supply unit 31 and solar blocks 32. A power supply unit 31 is not connected with the system bus 11, but a solar block 32 connected with the laptop is connected with it. By way of this solar block 32, sunlight that falls on the laptop is converted to electrical energy, and is made available on the system bus 11 to supply the consumer 10 and to charge the cells 21, 22, 23. In this connection, the individual solar blocks 32 can be addressed independent of one another, whereby each of the solar blocks 32 has a buffer capacitor 33 assigned to it, in order to guarantee optimal energy production by the individual solar blocks 32. This is done in that the voltage change at the buffer capacitor 33 is determined, and the charging voltage of the buffer capacitor is adapted to it. In this manner, it is guaranteed that solar blocks 32 with different insolation can also be handled differently, to the effect that a suitable charging voltage for the buffer capacitor 33 can be selected in the solar blocks 32. Not only these buffer capacitors 33 but also an accumulative capacitor 35, which supplies the required voltage of the system bus 11, are charged by way of a regulator 34. Parallel to the rechargeable batteries 20, a buffer rechargeable battery 25, which is a nickel-cadmium battery, is supplementally provided on the system bus 11. The aging problem that exists in the case of lithium ion batteries does not exist in the case of such a rechargeable battery, so that the buffer rechargeable battery 25 is not subject to greater aging despite incomplete charging cycles.

The supply of voltage to the consumer 10 is thus provided by the solar blocks 32, whereby because of the insolation, energy for further charging of the third cell 23 is also present. As long as the third cell 23 is not yet completely charged, a charging cycle with regard to the first cell 21 or the second cell 22 is not started, in any event, particularly since the charging state of the rechargeable batteries in question has also not yet reached a lower threshold value. Only when the lower threshold value of the stored energy in the first and second cells 21 and 22 is exceeded will charging of these cells be initiated.

Thus, a device and a method for charging rechargeable batteries is described above, which makes it possible to bring about a clear improvement in the useful lifetime of the rechargeable battery, by means of dividing the rechargeable battery into different cells and charging them one after the other.

REFERENCE SYMBOL LIST 10 consumer
11 system bus
20 rechargeable battery
21 first cell
22 second cell
23 third cell
24 switch
25 buffer rechargeable battery
30 voltage supply
31 power supply unit
32 solar block
33 buffer capacitor
34 regulator
35 accumulative capacitor

The invention claimed is:

1. A method for charging rechargeable batteries, in which at least one voltage supply supplies electrical energy to a consumer and is connected with at least one of the cells of a rechargeable battery that is divided into multiple similar cells that can be brought into a charging state or a discharging state independent of one another,
    wherein at most precisely one cell is charged at any point in time and charging of another cell does not start until after completion of this charging process,
    wherein the voltage supply is regularly disconnected from a cell only after the cell has been completely charged, whereby in the case that sufficient voltage for continuing the charging process is no longer available on the part of the voltage supply, this process is continued via connecting the cell with at least one of the other cells, and
    wherein a cell gives off the energy stored in the cell to the consumer only after the cell has been charged completely, unless neither the voltage supply nor another cell is available for providing electrical energy to the consumer.

2. The method according to claim 1, wherein a charging process is only started if the energy required for this is available on the part of the voltage supply.

* * * * *